(12) United States Patent
Nakamori et al.

(10) Patent No.: US 7,056,260 B2
(45) Date of Patent: Jun. 6, 2006

(54) DRIVE UNIT FOR VEHICLE

(75) Inventors: Yukinori Nakamori, Anjo (JP); Kiyotomo Miura, Anjo (JP); Satoru Wakuta, Anjo (JP); Kazutoshi Motoike, Toyota (JP); Masatoshi Adachi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 180 days.

(21) Appl. No.: 10/855,371

(22) Filed: May 28, 2004

(65) Prior Publication Data

US 2005/0124457 A1 Jun. 9, 2005

(30) Foreign Application Priority Data

May 29, 2003 (JP) ............................... 2003-153120

(51) Int. Cl.
*B60K 6/00* (2006.01)
*F02N 11/04* (2006.01)

(52) U.S. Cl. ............................................. 477/3; 475/5
(58) Field of Classification Search .................... 477/3, 477/5; 475/5
See application file for complete search history.

(56) References Cited

U.S. PATENT DOCUMENTS

| | | | |
|---|---|---|---|
| 3,623,568 A | | 11/1971 | Mori et al. |
| 5,934,395 A | | 8/1999 | Koide et al. |
| 5,967,940 A | * | 10/1999 | Yamaguchi ................. 477/107 |
| 6,629,024 B1 | | 9/2003 | Tabata et al. |
| 6,709,362 B1 | * | 3/2004 | Tomohiro et al. .............. 477/3 |
| 6,913,558 B1 | * | 7/2005 | Mori et al. ..................... 477/3 |
| 6,947,827 B1 | * | 9/2005 | Fuse et al. ................... 701/110 |
| 6,959,238 B1 | * | 10/2005 | Morishita et al. ............. 701/54 |
| 2003/0064854 A1 | | 4/2003 | Kotani |
| 2004/0084233 A1 | | 5/2004 | Wakuta et al. |
| 2004/0259680 A1 | | 12/2004 | Ozeki |

FOREIGN PATENT DOCUMENTS

| | | |
|---|---|---|
| JP | 47-31773 | 8/1972 |
| JP | A 09-170533 | 6/1997 |
| JP | A 2000-230442 | 8/2000 |
| JP | A 2001-041067 | 2/2001 |
| JP | A 2002-089307 | 3/2002 |
| JP | A 2002-115755 | 4/2002 |
| JP | A-2002-225578 | 8/2002 |
| JP | A 2002-372139 | 12/2002 |

OTHER PUBLICATIONS

U.S. Appl. No. 10/890,454, filed Jul. 14, 2004, Takami et al.

* cited by examiner

*Primary Examiner*—Sherry Estremsky
(74) *Attorney, Agent, or Firm*—Oliff & Berridge, PLC

(57) ABSTRACT

The drive unit for a vehicle has an engine driving control element for driving a first motor on the basis of an engine driving signal, and driving a second motor so as to restrain a reaction force in a power distributing planetary gear due to the driving of the first motor in a state in which the stepped speed change gear connects the second motor and an output shaft by brakes. Further, the drive unit has an electrically operated oil pump for generating an operating oil pressure of the brakes, and also has a control section having an electrically operated oil pump operation control element for operating the electrically operated oil pump prior to the control of the engine driving control element on the basis of an engine starting signal outputted in a vehicle stopped state.

20 Claims, 11 Drawing Sheets

| POSITION | | SOLENOID | | BRAKE | |
|---|---|---|---|---|---|
| | | SLV1 | SLV2 | B1 | B2 |
| P | | × | × | ○ | × |
| R | RATCHETING TIME | ○ | × | × | × |
| R | E/G STARTING TIME | ○ | ○ | × | ○ |
| N | | ○ | ○ | × | ○ |
| D | Lo | ○ | ○ | × | ○ |
| D | Hi | × | × | ○ | × |
| REMARKS | | ○ ON / × OFF | | APPLIED / RELEASE | |

FIG. 6

DRIVE UNIT FOR VEHICLE

This application claims priority from JP 2003-153120, filed May 29, 2003, the disclosure of which is incorporated herein in its entirety by reference thereto.

BACKGROUND OF THE INVENTION

1. Field of Invention

The invention relates to a drive unit for a vehicle, and is applicable to a hybrid vehicle, etc., and more particularly relates to a drive unit for a vehicle which is of a type (a so-called 2-motor split type) having first and second motors (conceptually including a generator) and has a structure able to effectively restrain reaction force during engine starting on the basis of the driving of the first motor.

2. Description of Related Art

The so-called 2-motor split type structure is conventionally mounted to a vehicle, for example, the automobile identified as a PRIUS®, and is practically used as a hybrid drive unit. In this type, an output from an internal combustion engine (hereinafter also simply called the engine) is distributed to the first motor (generally called the generator) and the running output side by a planetary gear. The output torque of the planetary gear is steplessly controlled by mainly controlling the operation of the first motor as the generator. Further, as necessary, the torque of the second motor (generally called a drive motor) is synthesized with the planetary gear output torque and is outputted to an output shaft.

The hybrid drive unit of the 2-motor split type in practical use is mounted in the vehicle as a drive unit for front engine and front drive (called FF in this specification). However, it is also considered that the hybrid drive unit of front engine and rear drive (called FR in this specification) type can be mounted in the vehicle.

In the above hybrid drive unit, for example, while a crankshaft is associatively rotated on the basis of the driving force of the first motor, the engine can be started in a state in which the operation of a predetermined rotating element of the planetary gear is restrained through a drive wheel engaged by a foot brake, the output shaft connected to this drive wheel, etc., i.e., in a state in which reaction force in the planetary gear using the driving of the first motor is restrained. However, in this case, when the reaction force based on the driving of the first motor is transmitted to the drive wheel side through the output shaft, etc., torque is instantaneously generated in the retreating direction of the vehicle body and gives an uncomfortable feeling to persons in the vehicle.

Therefore, for example, it is considered to control the operation of the second motor such that the second motor is approximately operated in synchronization with the driving of the first motor to restrain the reaction force in the planetary gear using the driving of the first motor by the output torque of the above second motor so as not to give the above uncomfortable feeling to the persons in this vehicle.

SUMMARY OF THE INVENTION

However, for example, when a structure for interposing a stepped speed change gear between the second motor and the output shaft is considered and the control technique as mentioned above is intended to be applied to this structure, there is a fear that the following problems are caused.

Namely, when the stepped speed change gear is arranged in the drive unit for a vehicle, it is considered to structure the drive unit such that the speed change stage is switched by engaging the predetermined rotating element of the stepped speed change gear by a frictional engaging means, such as a brake, etc., and the driving force from the engine side and the driving force of the second motor are transmitted to the drive wheel by changing the rotating speeds at a suitable time while these driving forces are synthesized. However, in this case, even when the output torque of the second motor is intended to act as a torque for restraining the reaction force based on the first motor at the engine starting time, no oil pressure for the engagement of the frictional engaging means can be generated before the engine is started in that a mechanical type oil pump is normally provided. Therefore, at the engine starting time, all the frictional engaging means of the above stepped speed change gear attain an opening state and, in such a situation, are unable to apply the driving force of the second motor as a force for restraining the reaction force.

Therefore, an object of the invention is to provide a drive unit for a vehicle able to reliably supply the oil pressure required in the engaging operation of the frictional engaging means of the stepped speed change gear even before the engine driving although the drive unit is a drive unit for the vehicle of the 2-motor split type having the stepped speed change gear, and structured so as to reliably prevent the uncomfortable feeling caused by the reaction force at the engine starting time so that the discussed problems are solved.

The invention comprises a drive unit for a vehicle comprising a first motor, power distributing means, a second motor, and a stepped speed change gear having frictional engaging means, wherein the engine driving force transmitted to an input shaft is distributed and transmitted to the first motor and an output section by the power distributing means, and the second motor is operated in association with the output section through the stepped speed change gear for performing a speed changing operation in accordance with the operation of the frictional engaging means, and the engine is started on the basis of the driving of the first motor, wherein the drive unit further comprises engine driving control means for driving the first motor on the basis of an engine driving signal, and driving the second motor so as to restrain reaction force in the power distributing means due to the driving of the first motor in a state in which the stepped speed change gear connects the second motor and the output section by the frictional engaging means; an electrically operated oil pump for generating an operating oil pressure of the frictional engaging means; and an electrically operated pump control section having pump operation control means for operating the electrically operated oil pump prior to the control of the engine driving control means on the basis of an engine starting signal outputted in a vehicle stopping state.

In accordance with the invention, the pump operation control means, operated on the basis of the engine starting signal outputted by turning on an ignition switch, etc., operates the electrically operated oil pump prior to the control of the engine driving control means based on the engine driving signal generated after the output of the starting signal. Accordingly, the electrically operated oil pump is operated before the second motor is driven prior to the engine starting. The operating oil pressure of the frictional engaging means can be reliably generated. Thus, although the drive unit has the stepped speed change gear of a structure unable to connect the second motor and the output section unless the frictional engaging means is engaged, the engine starting can be executed while a state able to restrain the reaction force in the power distributing means due to driving of the first motor is reliably attained. Accordingly, it is possible to reliably prevent an uncomfortable feeling caused by the reaction force at the engine starting time. The torque change caused by generating the driving force in starting the engine associatively rotated by driving the first motor can be absorbed by controlling the output torque of the second motor so as to cancel its torque increasing amount at the detecting time of this torque change e.g., while the torque applied to the output section is monitored by a sensor.

In the invention, the motor is not limited to a so-called motor in a narrow sense for converting electric energy into a rotating movement, but is a concept also including a so-called generator for converting the rotating movement into the electric energy.

Further, in the drive unit for a vehicle, the stepped speed change gear is structured so as to be able to be switched to a plurality of speed change stages, and is switched to a low speed stage among the plurality of stages at the control time of the engine driving control means. Because the stepped speed change gear is switched to the low speed stage at the control time of the engine driving control means, the driving force of the second motor can be reduced. Further, the stepped speed change gear is switched to a high speed stage among the plurality of stages at the control time of the engine driving control means and can be also more effectively applied as driving force for restraining the reaction force due to the first motor.

In the drive unit for a vehicle described above, the stepped speed change gear has a planetary gear unit, and the frictional engaging means is a plurality of brakes for engaging a predetermined rotating element of the planetary gear unit, and a hydraulic controller for controlling the oil pressure supplied to a hydraulic servo for operating the plurality of brakes is provided. Accordingly, the stepped speed change gear can be reliably transferred to the state connecting the second motor and the output section at the engine starting time by merely switching the engaging state of the brake at a suitable time on the basis of the supply of the oil pressure from the hydraulic controller to the hydraulic servo.

Further, as the hydraulic controller has a first solenoid valve for high speed stage switching and a second solenoid valve for low speed stage switching, and the stepped speed change gear is switched to the low speed stage by engaging the brake on the low speed stage side on the basis of the operation of the second solenoid valve at the control time of the engine driving control means, the drive unit permits, at the engine starting time, the stepped speed change gear to be rapidly switched to the low speed stage on the basis of the operation of the second solenoid valve, and the state able to more effectively restrain the reaction force at the engine starting time can be reliably attained. Additionally, when the stepped speed change gear is switched to the high speed stage by engaging the brake on the high speed stage side on the basis of the operation of the first solenoid valve at the control time of the engine driving control means, the driving force of the second motor can be effectively applied as a driving force for restraining the reaction force due to the first motor. Thus, when the drive unit is structured such that the second solenoid valve is set to a non-operating state by turning off a power source and the first solenoid valve is set to an operating state by turning off the power source, the stepped speed change gear is rapidly switched to the high speed stage and the state for restraining the reaction force at the engine starting time can be reliably attained. Further, because the high speed is achieved by turning off the power source of both of the solenoid valves, the load applied to a battery for supplying electric power can be reduced.

A variation in the drive unit for a vehicle includes motor driving control means for controlling the operation of the second motor, the second motor is arranged within a case for storing oil to be supplied to the hydraulic controller, and the motor driving control means drives the second motor until a predetermined condition is satisfied prior to the operation starting of the electrically operated oil pump using the pump operation control means. Accordingly, because it is disadvantageous to operate the electrically operated oil pump when the oil temperature low and viscosity high before the engine is started, the pump can be operated in a state in which the oil within the case is agitated by driving the second motor and the oil temperature is raised and the viscosity is reduced by its agitating resistance. Thus, because the load of the electrically operated oil pump at its operation starting time is greatly reduced, the electrically operated oil pump can be reduced in size yet provide a preferable pump operation starting state and the mounting of the electrically operated oil pump to the vehicle can be improved.

Further, because the frictional engaging means can be operated by the oil pressure provided through the operation of the mechanical type oil pump when the engine is driven, the electrically operated oil pump can function as an auxiliary structure to the mechanical type oil pump. Accordingly, the electrically operated oil pump can be compact and the mounting to the vehicle can be further improved.

BRIEF DESCRIPTION OF THE DRAWINGS

The invention will be described with reference to the drawings, in which:

FIG. 6 is a view showing the operating situations of the linear solenoid valves and the brakes corresponding to each position of a shift lever;

DETAILED DESCRIPTION OF PREFERRED EMBODIMENTS

Figure 1:
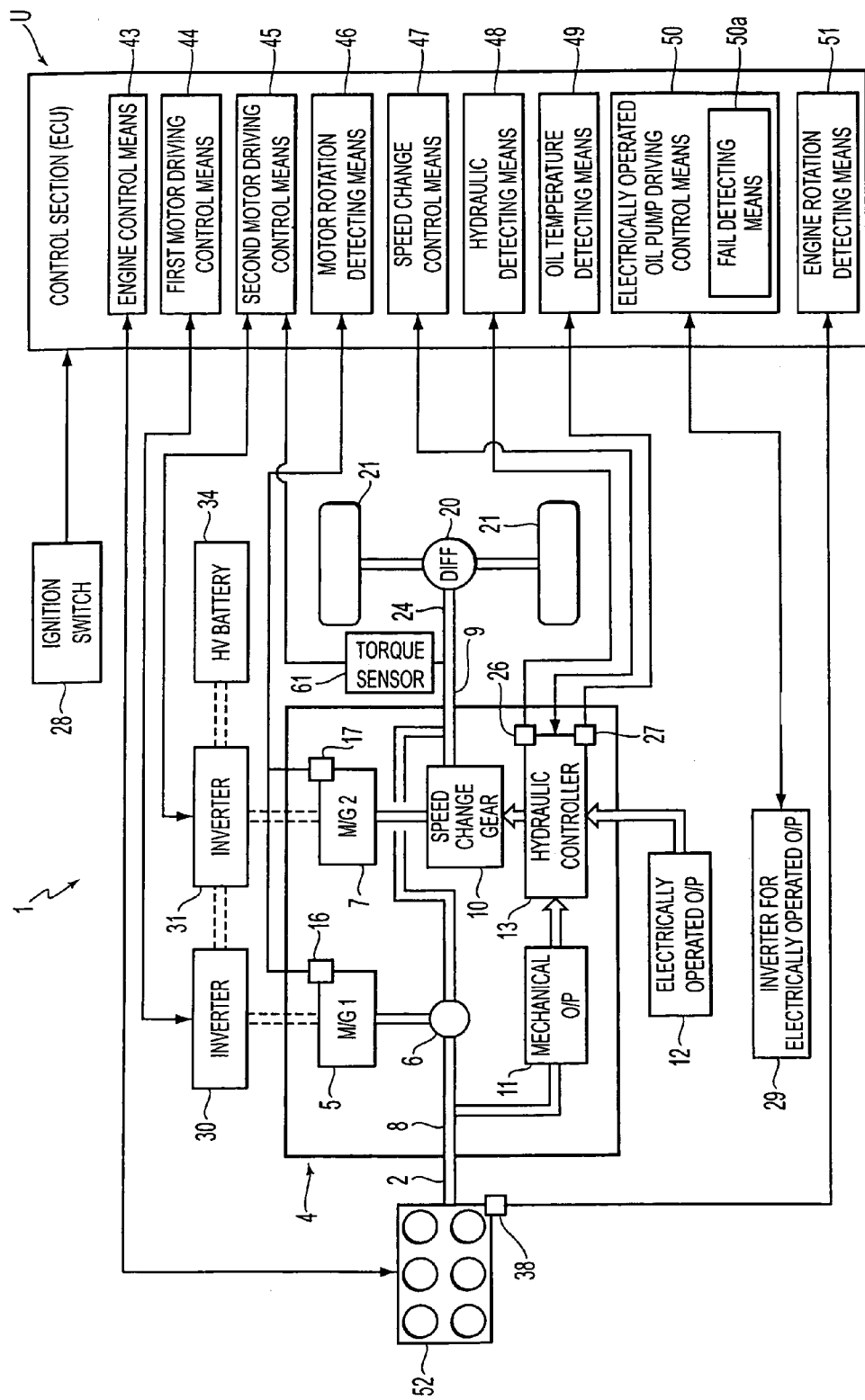
FIG. 1 is a block diagram showing a drive unit for a vehicle and its control system in a first mode of the invention.
Figure 2:
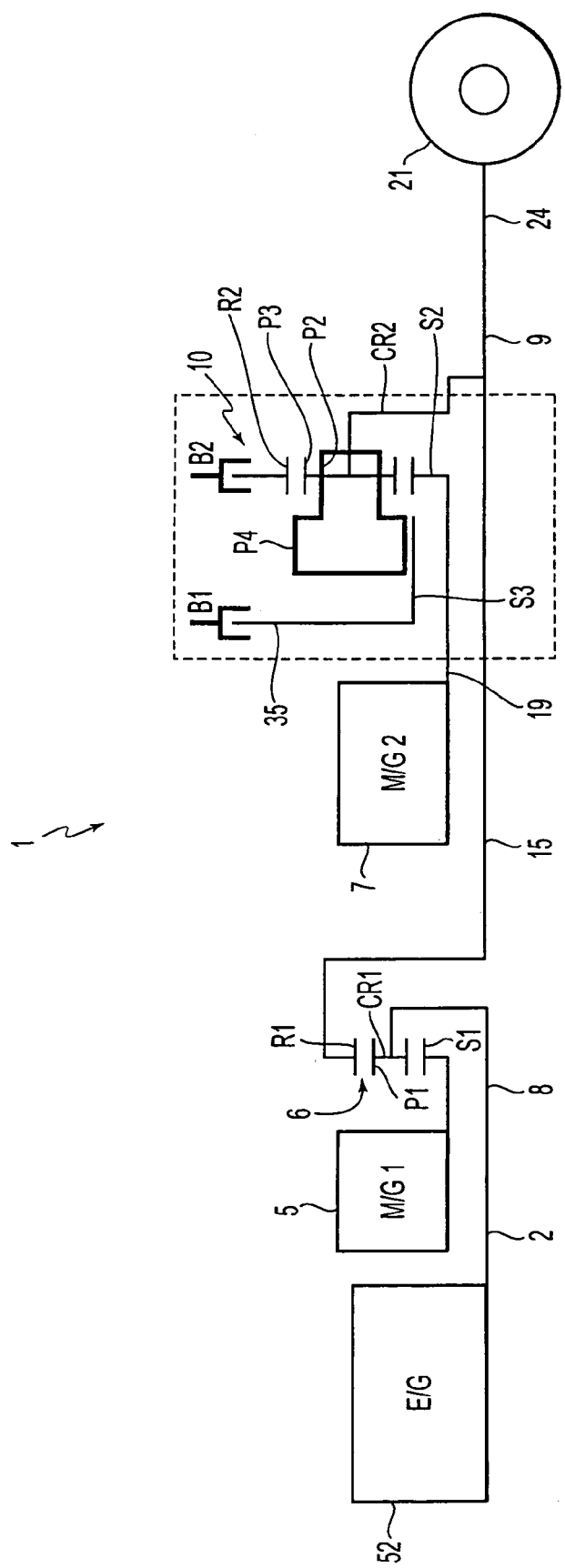
FIG. 2 is a block diagram showing a portion of the driving system in FIG. 1.
Figure 3:
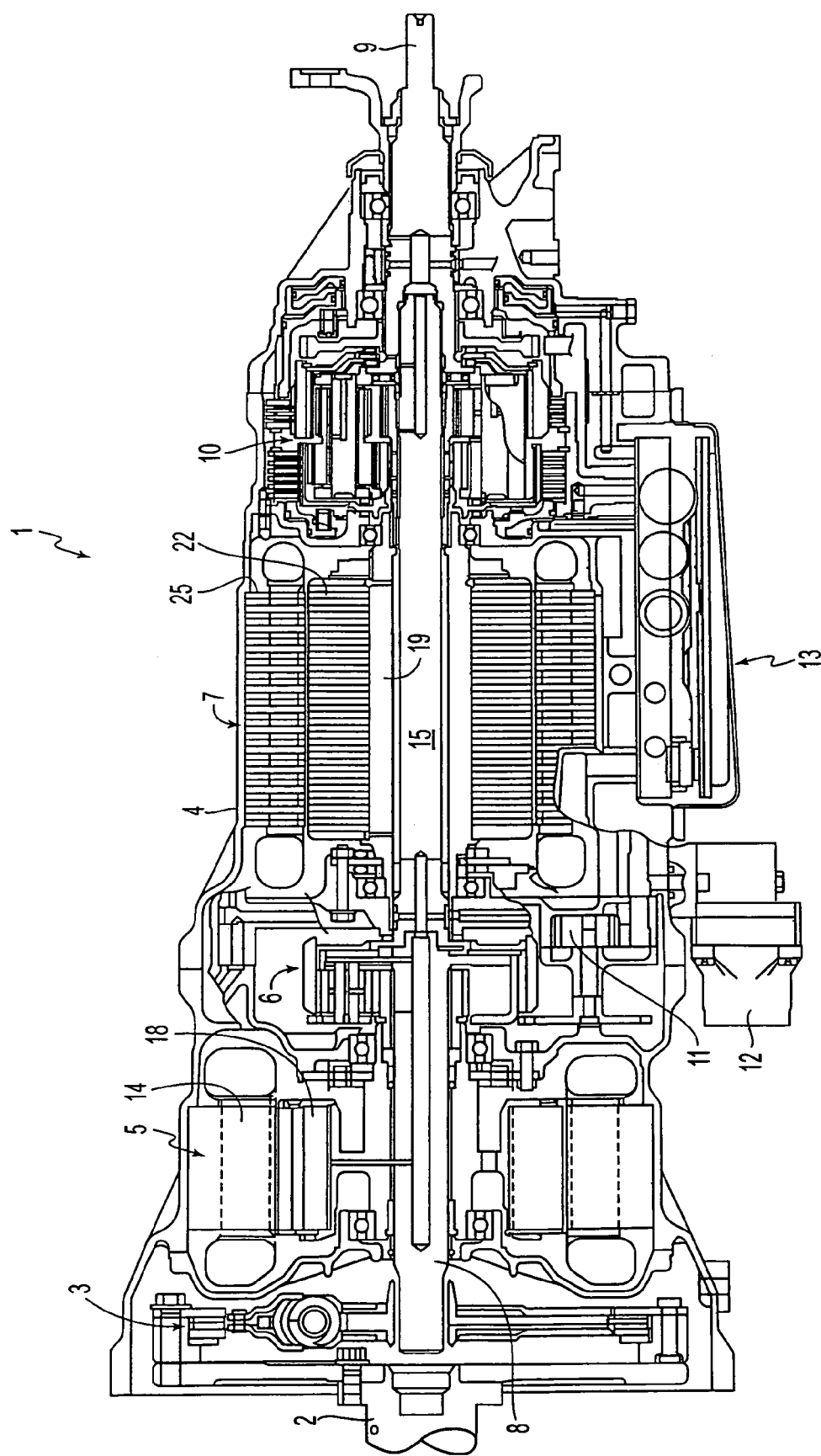
FIG. 3 is a cross-sectional view showing the structure of the drive unit for a vehicle corresponding to FIG. 2.

A first mode of the invention will now be explained. The structure of the drive unit for a vehicle in this mode will first be explained using FIG. 3. As shown, the drive unit 1 for a vehicle is structured as the 2-motor split type. The drive unit 1 has a damper device 3, a first motor 5, a power distributing planetary gear (power distributing means) 6, a second motor 7, and a stepped speed change gear 10 within a case 4. The damper device 3 is sequentially arranged in a uniaxial shape aligned with a crankshaft 2 from the side of an internal combustion engine 52 (FIGS. 1 and 2). The stepped speed change gear 10 has brakes B1, B2 able to change the rotating speed of the second motor 7 and transmit the rotation of the second motor 7 to an output shaft 9.

An input shaft 8 is arranged in the inner circumferential portion of the first motor 5 and the power distributing planetary gear 6 and is aligned with the crankshaft 2 in a uniaxial shape. Further, an intermediate shaft 15 is arranged in the inner circumferential portion of the second motor 7 and the stepped speed change gear 10. The intermediate shaft 15 is connected to the input shaft 8 through the power distributing planetary gear 6, and extends on a side of a drive wheel 21 (FIGS. 1 and 2). The intermediate shaft 15 is connected to the output shaft 9, rightward in FIG. 3, in a state in which a rotor shaft 19 is rotatably fitted to the intermediate shaft 15. The output shaft 9 projects from the case 4 and is connected to a differential device 20 (FIG. 1) through a propeller shaft 24 (FIG. 2) and coupling (not shown). Further, driving force is transmitted from the differential device 20 to the drive wheels 21, 21 through left and right drive shafts.

Each of the first motor 5 and the second motor 7 is a motor-generator provided by an AC synchronous motor. The first motor 5 and the second motor 7 respectively have stators 14, 25 fixed to the case 4, and also have rotors 18, 22 rotatably supported on the inside diameter sides of the stators 14, 25 with predetermined air gaps. Each of the stators 14, 25 has a stator core and a coil wound around the stator core. Further, the second motor 7 has output characteristics greater than those of the first motor 5.

A mechanical type oil pump 11 is arranged between the power distributing planetary gear 6 and the second motor 7 and is operated by receiving the driving force of the internal combustion engine 52. An electrically operated oil pump 12 is arranged in the lower portion of the case 4 adjacent the outer circumferential portion of the mechanical type oil pump 11 and is operated by receiving a supply of electric power from a battery (not shown). Further, a hydraulic controller 13 is arranged in the lower portion of the case 4 below the second motor 7 and the stepped speed change gear 10.

Figure 4:
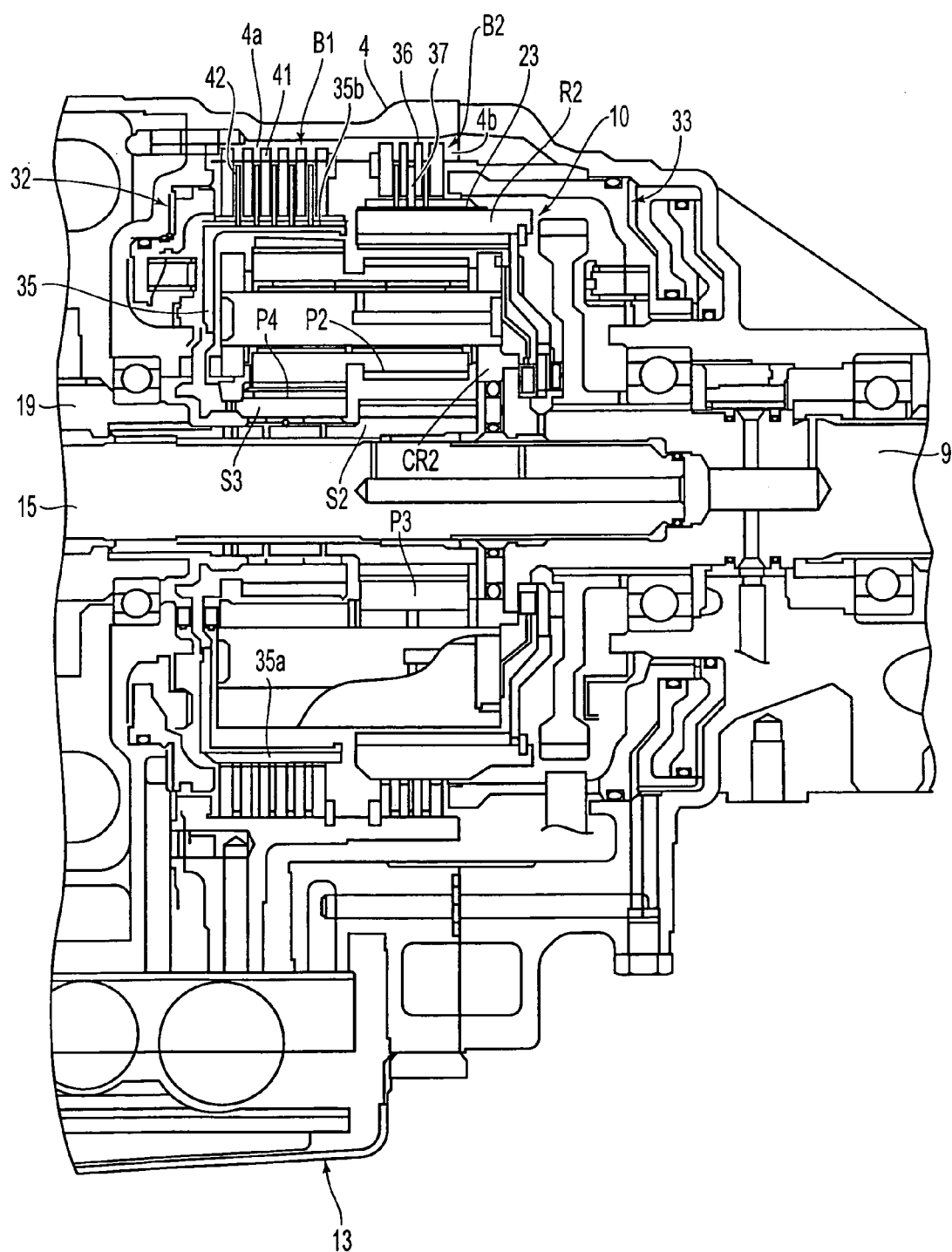
FIG. 4 is an enlarged cross-sectional view showing a speed change gear and a brake of the drive unit in FIG. 3.

The hydraulic controller 13 supplies oil supplied from the mechanical type oil pump 11 or the electrically operated oil pump 12 to the second motor 7 and the speed change gear 10 as oil for cooling and/or lubrication by switching respective built-in valves. The hydraulic controller 13 also supplies the oil to hydraulic servos 32, 33 (FIG. 4) as oil for performing the disconnecting and connecting operations of the brakes B1, B2 (FIGS. 2 and 4). The mechanical type oil pump 11 is rotated and operated on the basis of the driving of the internal combustion engine 52 and generates the oil pressure supplied to the hydraulic controller 13. Further, the electrically operated oil pump 12 is operated so as to generate the oil pressure supplied to the hydraulic controller 13 at the starting time of the engine 52, an EV running time using the second motor 7 in a stopped state of the engine 52, or an idling stop control time for temporarily stopping the engine 52, etc.

The structure of the power distributing planetary gear 6 will next be explained using FIG. 2. The power distributing planetary gear 6 has a carrier CR1, a pinion P1 supported by the carrier CR1, a sun gear S1 and a ring gear R1. The carrier CR1 is connected to the input shaft 8 connected to the crankshaft 2 of the internal combustion engine 52. The shafts 2, 8 are mounted to the vehicle in the uniaxial shape, and the input shaft 8 is operated in association with the crankshaft 2. The sun gear S1 is connected to the rotor 18 of the first motor 5 (see FIG. 3) so as to be operated in association with the first motor 5. The ring gear R1 is connected to the intermediate shaft 15, which is connected to the drive wheel 21, so as to be operated in association with the intermediate shaft 15. The power distributing planetary gear 6 controls the output of the engine 52 and the input of the intermediate shaft 15 by controlling the reaction force applied to the sun gear S1 by the first motor 5.

Further, as shown in FIG. 1, the drive unit has a control section (ECU) U for outputting a control signal to the hydraulic controller 13 to control the operations of the brakes B1, B2, and also outputting a control signal to the electrically operated oil pump 12 for supplying the oil pressure to the hydraulic controller 13. The control section U will be described later in detail.

The structure of the stepped speed change gear 10 will next be explained in detail using FIGS. 2 and 4. The stepped speed change gear 10 has first and second planetary gear units and the brakes B1, B2 arranged on the outer circumferential sides of the first and second planetary gear units. The first planetary gear unit is comprised of a sun gear S2 of a sleeve shape, a ring gear R2 and small pinions P2, P3. The sun gear S2 is rotatably fitted to the intermediate shaft 15 in a state in which the front end portion (left-hand end portion in FIG. 4) is spline-connected to the rotor shaft 19 (i.e., a state connected to the drive motor 7). The ring gear R2 is rotatably supported with respect to the intermediate shaft 15 on the outer circumferential side of the sun gear S2. The small pinions P2, P3 are connected to the output shaft 9 and are engaged with both the sun gear S2 and the ring gear R2 and are operated in association with these gears. The small pinion P2 is rotated integrally with a large pinion P4 and is directly engaged with the small pinion P3. Further, the small pinion P3 is directly engaged with the sun gear S2 and the ring gear R2, and the large pinion P4 is directly engaged with only a sun gear S3.

The second planetary gear unit is comprised of the large pinion P4 and the sun gear S3. The large pinion P4 has a diameter larger than that of the small pinion P2 and is supported by the carrier CR2 in the state where it is connected to the small pinion P2 in a uniaxial shape. The sun gear S3 is rotatably fitted to the outer circumference of the sun gear S2 and engaged with the large pinion P4. The carrier CR2 is supported on the same axis as the intermediate shaft 15 in a state in which a plurality of sets of the pinions P2, P3, P4 are rotatably supported.

A hub member 35 is integrally connected to the sun gear S3. The hub member 35 has a hub portion 35a extended in the outside diameter direction of the sun gear S3 and extended in parallel with the sun gear S3. Plural frictional plates 42 are engaged with a spline groove 35b formed on the outer circumferential face of the hub portion 35a so as to regulate rotation with respect to the hub portion 35a. Further, a spline groove 4a is formed in the part opposed to the hub portion 35a within the case 4. Plural frictional plates 41 are engaged with the spline groove 4a so as to regulate rotation with respect to the case 4 and to be interposed between the respective frictional plates 42. The brake B1 is constructed by the plural frictional plates 41, 42 and is operated so as to be applied and released by operating the hydraulic servo 32 arranged adjacent to the brake B1.

On the other hand, plural frictional plates 37 are engaged with a spline groove 23 formed on the outer circumferential face of the ring gear R2 so as to regulate rotation with respect to the ring gear R2. Further, a spline groove 4b is formed in the part opposed to the ring gear R2 within the case 4. Plural frictional plates 36 are engaged with the spline groove 4b so as to be interposed between the respective frictional plates 37 in a state in which the rotation of the frictional plates 36 with respect to the case 4 is regulated. The brake B2 is constructed by the plural frictional plates 36, 37 and is operated so as to be applied and released by operating the hydraulic servo 33 arranged adjacent to the brake B2.

In the stepped speed change gear 10 having the above structure, the speed changing operation is performed by switching the rotating state of the carrier CR2 by the brakes B1, B2. Namely, the stepped speed change gear 10 is switched to high and low speed stages by allowing or regulating each of the rotations of the ring gear R2 of the first planetary gear unit and the sun gear S3 of the second planetary gear unit on the basis of each of the operations of the brakes B1, B2. Further, a state for interrupting the power transmission between the second motor 7 and the drive wheel 21 is attained.

Figure 5:
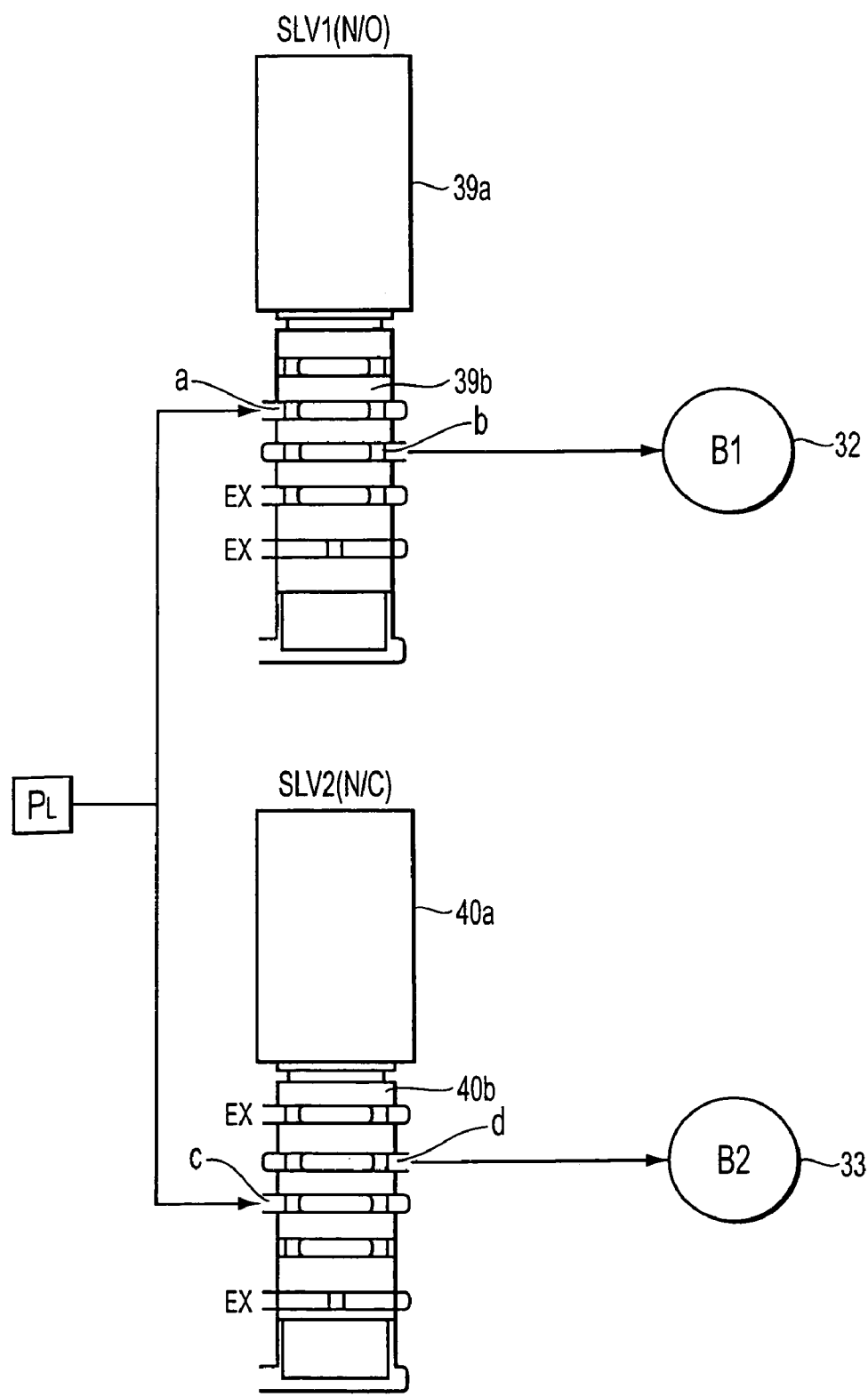
FIG. 5 is a schematic view showing linear solenoid valves in a hydraulic controller.

Here, the structures of solenoid valves SLV1, SLV2 built into the hydraulic controller 13 and switched and operated so as to supply the oil pressure to the hydraulic servos 32, 33 will be explained using FIG. 5. The solenoid valve SLV1 is a normal open type having a solenoid portion 39a and a valve portion 39b. The solenoid portion 39a is turned on and off in response to a control signal from a speed change control means 47 (FIG. 1) of the control section U. The oil pressure supplied to the hydraulic servo 32 is interrupted and the brake B1 is released by communicating an input port a and a drain port EX. Otherwise, the oil pressure (line pressure $P_L$) is supplied to the hydraulic servo 32 and the brake B1 is engaged by communicating the input port a and an output port b. Further, the solenoid valve SLV2 is a normal closed type having a solenoid portion 40a and a valve portion 40b. The solenoid portion 40a is turned on and off in response to the control signal from the speed change control means 47. The oil pressure (line pressure $P_L$) is supplied to the hydraulic servo 33 and the brake B2 is engaged by communicating an input port c and an output port d. Otherwise, the brake B2 is released by communicating the input port c and the drain port EX.

An operating mode of the speed change gear 10 based on each of the operations of the brakes B1, B2 will be explained using FIG. 6. The mark "o" in this figure shows an ON state in the solenoid valve and a supply state (applied) of the oil pressure to the hydraulic servos 32, 33 for the brakes B1, B2. Further, the mark "X" shows an OFF state in the solenoid valves SLV1, SLV2 and a release state (release) of the oil pressure supplied to the hydraulic servos 32, 33 for the brakes B1, B2.

For example, at a ratcheting time at which a parking device (not shown), arranged in the same axial shape as the output shaft 9 (FIG. 2), is operated in association with the operation of a shift lever (not shown) to a parking (P) range, the solenoid valve SLV1 is turned on, the solenoid valve SLV2 is turned off and both the brakes B1, B2 are released. Accordingly, the drive unit can attain a state for allowing the rotations of both the sun gear S3 and the ring gear R2 and applying no inertia of the second motor 7 rotated at, e.g., a slight speed, to the parking device without outputting the rotation of the second motor 7 from the carrier CR2 to the output shaft 9.

Further, when the internal combustion engine 52, in a stopped state, is started in the P-range in the vehicle stopped state, both the solenoid valves SLV1, SLV2 are turned on and the brake B1 is released and the brake B2 is engaged.

Thus, the rotation of the ring gear R2 is regulated and the rotation of the sun gear S3 is allowed and the stepped speed change gear 10 is switched to the low speed stage (Lo). In this state, it is possible to start the engine 52 on the basis of the driving of the first motor 5 while the second motor 7 is operated so as to restrain the reaction force in the power distributing planetary gear 6 due to the driving of the first motor 5 and the rotation of the ring gear R1 is restrained.

At the time of the normal parking performed by stopping the vehicle, both the solenoid valves SLV1, SLV2 are turned off, the brake B1 is engaged and the brake B2 is released. Thus, in the stepped speed change gear 10, the rotation of the sun gear S3 is regulated and the rotation of the ring gear R2 is allowed and the stepped speed change gear 10 is switched to the high speed stage (Hi).

In a reverse (R) range, both of the solenoid valves SLV1, SLV2 are turned on and the brake B1 is released and the brake B2 is engaged. Thus, the rotation of the ring gear R2 is regulated and the rotation of the sun gear S3 is allowed and the stepped speed change gear 10 is switched to the low speed stage. In this state, reaction force control based on the first motor 5 is performed. In a neutral (N) range, the stepped speed change gear 10 is similarly switched to the low speed stage.

In a running (D) range, both the solenoid valves SLV1, SLV2 are turned on by control at a suitable time, the brake B1 is released and the brake B2 is engaged so that the stepped speed change gear 10 is switched to the low speed stage. Further, the stepped speed change gear 10 is switched to the high speed stage by turning off both the solenoid valves SLV1, SLV2, engaging the brake B1 and releasing the brake B2.

The structure of a control system for controlling the operation of the drive unit 1 for a vehicle will be explained using FIG. 1. As shown in the figure, the control system has the control section U. The control section U has an engine control means 43, a first motor driving control means 44, a second motor driving control means 45, a motor rotation detecting means 46, a speed change control means 47, a hydraulic detecting means 48, an oil temperature detecting means 49, an electrically operated oil pump driving control means 50 having a fail detecting means 50a, and an engine rotation detecting means 51. In this figure, a broken line shows an electric power transmission path, a solid line shows a power transmission path, a thick arrow shows a flow path of oil, and a thin arrow shows a flow path of a signal.

The power distributing planetary gear 6 operated in association with the input shaft 8, connected to the crankshaft 2 of the internal combustion engine 52 with the uniaxial shape, the first motor 5 connected to the power distributing planetary gear 6 and operated in association with the power distributing planetary gear 6, the stepped speed change gear 10, the hydraulic controller 13 and the mechanical type oil pump 11 are arranged within the case 4. The internal combustion engine 52 is arranged on the forward side (leftward in FIG. 1) of the case 4, and the electrically operated oil pump 12 is arranged on the lower portion side of the case 4. A rotation detecting sensor 16 for detecting the rotation of the first motor 5 is arranged in the first motor 5, and a rotation detecting sensor 17 for detecting the rotation of the second motor 7 is arranged in the second motor 7. A hydraulic detecting sensor 26 for detecting the oil pressure, and an oil temperature detecting sensor 27 for detecting the temperature (oil temperature) of the oil are arranged in the hydraulic controller 13. A rotation detecting sensor 38 for detecting the rotation of the internal combustion engine 52 is arranged in the internal combustion engine 52. The output shaft 9 that can receive the driving forces of the engine 52 and the second motor 7, has a torque sensor 51 for detecting the torque applied to the output shaft 9.

Further, an inverter 30, an inverter 31, a battery 34 for HV (hybrid) and an inverter 29 for the electrically operated oil pump (O/P) are provided. The inverter 30 generates a driving signal with respect to the first motor 5 on the basis of a control signal from the first motor driving control means 44. The inverter 31 generates a driving signal with respect to the second motor 7 on the basis of a control signal from the second motor driving control means 45. The battery 34 supplies electric power to the inverters 30, 31. The inverter 29 generates a driving signal with respect to the electrically operated oil pump 12.

The engine control means 43 executes control relative to the driving of the internal combustion engine 52, such as the control of the vehicle speed detected on the basis of the detecting result of an unillustrated vehicle speed sensor, stoppage control of the internal combustion engine 52 based on a brake operating state, etc. detected by a brake sensor (not shown), ignition control of the engine 52, a complete combustion judgment of the engine 52, etc. An engine driving signal is outputted after an engine starting signal is outputted on the basis of the turning-on of an ignition switch 28 in starting the internal combustion engine 52 in the vehicle stopped state. In this output of the engine driving signal, the engine control means 43 performs a control operation so as to ignite the engine 52 by fuel injection, etc. when the rotation number of the engine 52 associatively rotated through the crankshaft 2 by the driving of the first motor 5 reaches a predetermined ignitable rotation number $N_A$ (see FIG. 8) while this rotation number is monitored on the basis of the detection of the rotation detecting sensor 38.

The first motor driving control means 44 outputs the control signal to the inverter 30 and controls the operation of the inverter 30 so as to generate the driving signal with respect to the first motor 5. Further, the second motor driving control means 45 outputs the control signal to the inverter 31 and controls the operation of the inverter 31 so as to generate the driving signal with respect to the second motor 7. These first and second motor driving control means 44, 45 respectively execute running driving control including starting control, stoppage control and assist control using the first and second motors 5, 7, charge control for charging the battery 34 for HV, and regenerative control at a decelerating time, etc., by generating the driving signal in the inverters 30, 31 at a suitable time. Further, these motor control means 44, 45 respectively control the operations of the first and second motors 5, 7 at a suitable time on the basis of the intention of a driver, based on the detecting result of SOC (remaining charge capacity) of the battery 34 for HV using a battery sensor (not shown), and the detecting result of an accelerator aperture sensor (not shown) together with vehicle speed information, output rotation information and operation position information of the shift lever (not shown).

Further, when the internal combustion engine 52 is started in the vehicle stopped state, the engine starting signal is outputted on the basis of a turning-on of the ignition switch 28. Thereafter, when the engine driving signal is outputted from the engine control means 43, the first motor driving control means 44 controls the operation of the inverter 30 in response to the engine driving signal, and transmits the driving signal to the first motor 5 so as to associatively rotate the internal combustion engine 52 through the crankshaft 2 until the internal combustion engine 52 reaches a predetermined rotation number. Simultaneously, the second motor driving control means 45 performs a control operation such that torque, that can restrain reaction force in the power distributing planetary gear 6 due to the driving of the first motor 5, is outputted from the second motor 7. Further, when the engine 52, associatively rotated by the driving of the first motor 5, is started and a torque change in generating the driving force is detected while the torque applied to the output shaft 9 is monitored through the torque sensor 51 at all times, the second motor driving control means 45 controls the output torque of the second motor 7 so as to cancel its torque increasing amount.

The motor rotation detecting means 46 detects the rotating situation (rotation number and torque) of both the first motor 5 and the second motor 7 on the basis of the detecting results of the rotation detecting sensor 16 and the rotation detecting sensor 17, and outputs the rotating situation to the first motor driving control means 44 and the second motor driving control means 45.

Re-gripping control using the engagement and release of the sun gear S3 and the ring gear R2 arranged in the stepped speed change gear 10 on the basis of the applying and releasing operations of the brakes B1, B2 is performed by the speed change control means 47 on the basis of, e.g., the vehicle speed information, the accelerator aperture information, etc. The speed change control means 47 further outputs the control signal to the hydraulic controller 13 so as to execute the speed change control using the stepped speed change gear 10.

The first motor 5 is operated by the engine control means 43, the first motor driving control means 44, the second motor driving control means 45 and the speed change control means 47 on the basis of the engine driving signal. The engine driving control means, for operating the second motor 7, is structured so as to restrain the reaction force in the power distributing planetary gear 6 using the driving of the first motor 5 in a state in which the stepped speed change gear 10 connects the second motor 7 and the output shaft 9 by the brakes B1, B2.

Figure 8:
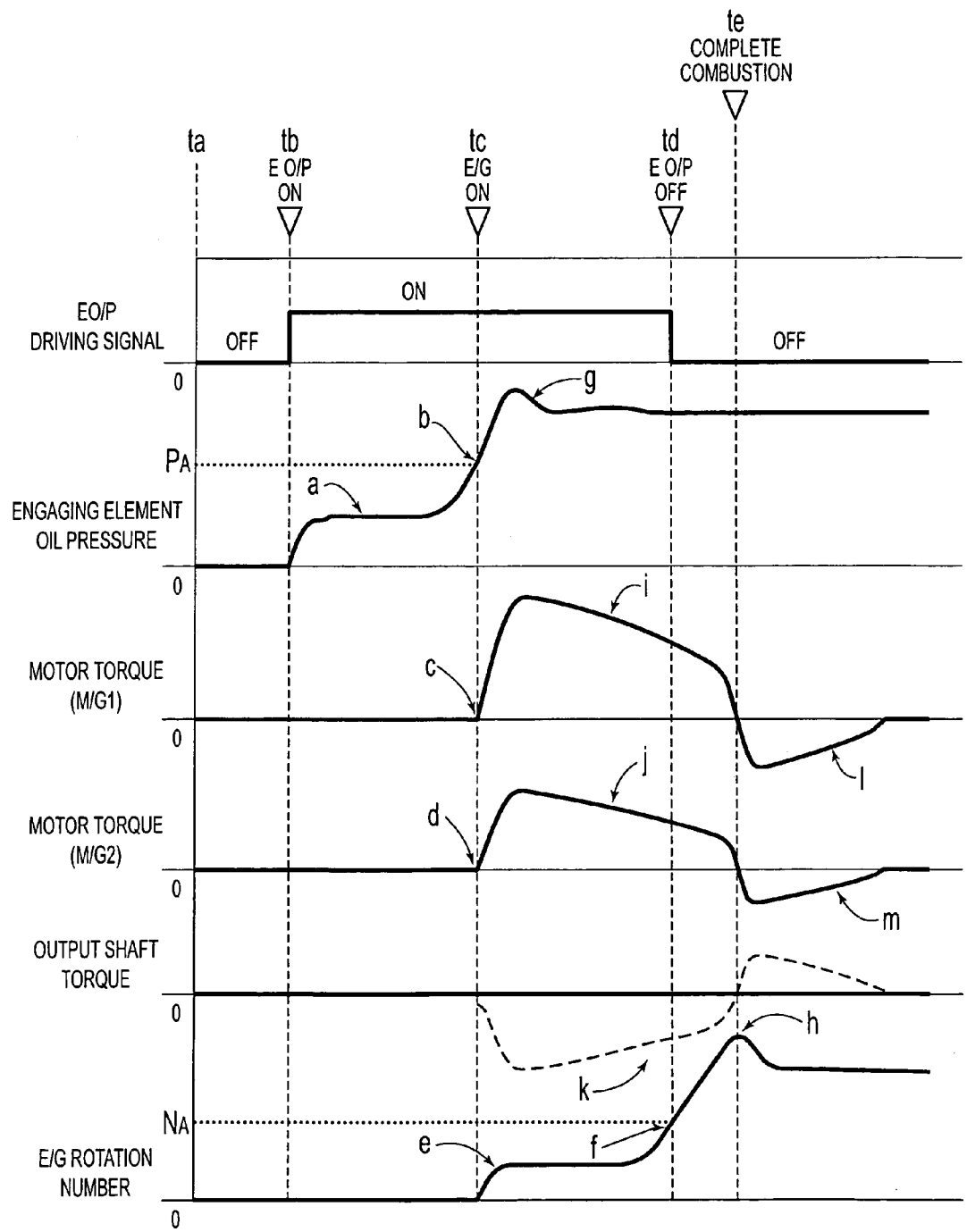
FIG. 8 is a time chart corresponding to FIG. 7.

The engine driving signal is a signal outputted when the engine starting signal is outputted on the basis of the turning-on of the ignition switch 28 in the vehicle stopped state and the electrically operated oil pump 12 is further operated on the basis of the engine starting signal and the oil pressure reaches a predetermined value $P_A$ (FIG. 8). However, even when the ignition switch 28 is turned on in the vehicle stopped state, it is not necessary to again idle the internal combustion engine 52 when the ignition switch 28 is again turned on before a predetermined time has passed after, e.g., running using engine driving is once terminated. Accordingly, the control operation can be performed so as not to output both the engine starting signal and the engine driving signal. In this case, the control operation can be performed so as to start the running using the driving of the second motor 7 in response to an operation in which a side brake (or foot brake) is released and an accelerator pedal is stepped on by a driver, etc.

The hydraulic detecting means 48 detects the oil pressure (line pressure, etc.) supplied from the mechanical type oil pump 11 or the electrically operated oil pump 12 and adjusted by regulator valve (not shown), etc. on the basis of the detecting result of the hydraulic detecting sensor 26. Further, the oil temperature detecting means 49 detects the temperature (oil temperature) of oil returned to the hydraulic controller 13 on the basis of the detecting result of the oil temperature detecting sensor 27.

The electrically operated oil pump driving control means 50 has a function of controlling the operation of the electrically operated oil pump 12 at a suitable time. Further, the electrically operated oil pump driving control means 50 stops the operation of the electrically operated oil pump 12 when a failure of the electrically operated oil pump 12, generated during a predetermined stroke, is detected by its fail detecting means 50a. Further, the electrically operated oil pump driving control means 50 has a function of operating the electrically operated oil pump 12 prior to the control of the engine driving control means (43, 44, 45, 47) based on the engine driving signal on the basis of the engine starting signal outputted on the basis of the turning-on of the ignition switch 28. Further, the engine rotation detecting means 51 detects the rotation number of the internal combustion engine 52 on the basis of the detecting result of the rotation detecting sensor 38.

Figure 7:
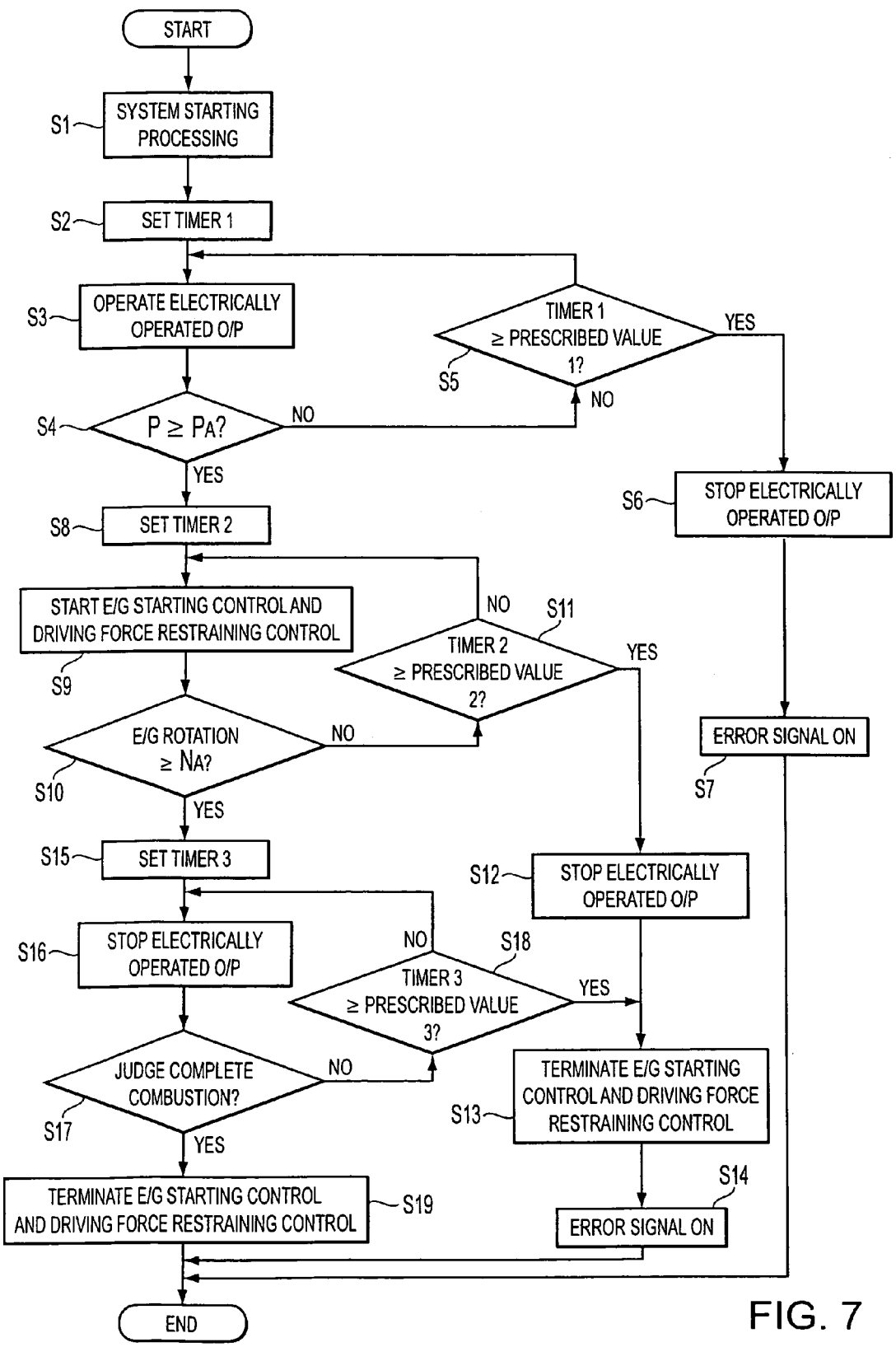
FIG. 7 is a flow chart showing a control example using the drive unit for a vehicle in the first mode.

The operation of the drive unit 1 for a vehicle having the above structure will be explained with reference to FIGS. 1, 7 and 8. FIG. 7 is a flow chart showing a control example for this mode. FIG. 8 is a time chart showing operation timing of each portion in the control. FIG. 8 sequentially shows, from top to bottom, an electrically operated oil pump (EO/P) driving signal, the oil pressure (engaging element oil pressure) applied to the brakes B1, B2, the motor torque of the first motor 5 (M/G1), the motor torque of the second motor 7 (M/G2), the torque of the output shaft 9, and the engine (E/G) rotation number.

When the ignition switch 28 is turned on in the stopped states (time ta of FIG. 8) of the internal combustion engine 52, the first motor 5 and the second motor 7, the control section U starts system starting processing (step S1) for starting each control means and outputs the engine starting signal. After a timer 1 is set in step S2, the operation of the electrically operated oil pump 12 is started on the basis of the engine starting signal in step S3. In this case, the driving signal of the electrically operated oil pump 12 is turned on (time tb) and the operation of the electrically operated oil pump 12 is started. Thus, the engaging element oil pressure P gradually rises from the time tb (arrow a).

In this case, while the hydraulic detecting means 48 monitors the rising of the oil pressure P through the hydraulic detecting sensor 26, the hydraulic detecting means 48 judges whether the oil pressure P becomes a predetermined value $P_A$ or more (step S4). As its result, when the hydraulic detecting means 48 judges that the oil pressure P becomes the predetermined value $P_A$ or more (time tc, arrow b), the process proceeds to step S8. In contrast to this, when the hydraulic detecting means 48 judges that the oil pressure P has not become equal to or greater than the predetermined value $P_A$, the process proceeds to step S5. It is then judged whether the value of the timer 1, set in step S2, becomes a prescribed value 1 or more.

If the value of the timer 1 is less than the prescribed value 1 in the above step S5, the process returns to step S3 and the processing of the step S3 is repeated. In contrast to this, when it is judged that the value of the timer 1 becomes the prescribed value 1 or more, the electrically operated oil pump driving control means 50 stops the operation of the electrically operated oil pump 12 (step S6). Further, the fail detecting means 50a detects the failure and sets an error signal to ON (step S7), and the processing is terminated.

In contrast to this, when it is judged in the step S4 that the oil pressure P becomes the predetermined value $P_A$ or more, the process proceeds to step S8 and a timer 2 is set. Further, in step S9, engine (E/G) starting control and driving force restraining control are started by the engine driving control means made up of the engine control means 43, the first motor driving control means 44, the second motor driving control means 45, and the speed change control means 47 on the basis of the engine driving signal outputted when the oil pressure P has reached the predetermined value $P_A$. Namely, the first motor driving control means 44 starts the driving of the first motor 5 (time tc, arrow c) in response to the engine driving signal so as to associatively rotate the internal combustion engine 52 through the crankshaft 2 until the internal combustion engine 52 reaches a predetermined rotation number $N_A$. Simultaneously, the second motor driving control means 45 starts torque output (time tc, arrow d) so as to be able to restrain the reaction force in the power distributing planetary gear 6 due to the driving of the first motor 5.

In step S10, the engine control means 43 judges whether the rotation number (E/G rotation)(arrow e) of the internal combustion engine 52 beginning to be associatively rotated from the time tc reaches the predetermined ignitable rotation number $N_A$ or more. As its result, when the engine rotation number becomes the predetermined rotation number $N_A$ or more (time td, arrow f), ignition control using the engine control means 43 is performed and the process proceeds to step S15.

When the internal combustion engine 52 is started by the ignition control, the second motor driving control means 45 monitors the torque applied to the output shaft 9 through the torque sensor 51 at all times. Accordingly, when the engine 52 in the associative rotating state is started and the driving force is generated, the motor driving control means 45 detects a torque change of the output shaft 9 and controls the output torque of the second motor 7 so as to cancel its torque increasing amount. Therefore, the engine can be started without changing the torque of the output shaft 9 (solid line). The arrow g, after the time tc, shows a temporary oil pressure increase caused by the beginning of generation of the oil pressure of the mechanical type oil pump 11 provided by the rotation of the internal combustion engine 52 beginning to be associatively rotated from the time tc. Further, the broken line shown by the arrow k shows output shaft torque when no driving force restraining control using the second motor (M/G2) 7 is executed.

When it is judged in step S10 that the engine rotation number is less than the predetermined rotation number $N_A$, the process proceeds to step S1. In step S11, it is judged whether the value of the timer 2, set in step S8, becomes a prescribed value 2 or more. As a result of the comparison in step S11, if the value of the timer 2 is less than the prescribed value 2, the process returns to step S9 and the processing of step S9 is repeated. In contrast to this, when it is judged that the value of the timer 2 is the prescribed value 2 or more, the electrically operated oil pump driving control means 50 stops the operation of the electrically operated oil pump 12 (step S12). The engine control means 43, etc. then terminates the engine starting control and the driving force restraining control (step S13). Further, the fail detecting means 50a detects the failure and sets the error signal to ON (step S14) and the processing is terminated.

A timer 3 is set in step S15, reached when the engine rotation number becomes the predetermined rotation number $N_A$ or more (step S10, yes). Further, in step S16, the electrically operated oil pump driving control means 50 sets the electrically operated oil pump driving signal to OFF (time td) and the operation of the electrically operated oil pump 12 is stopped. Thereafter, in step S17, the engine control means 43 makes a complete combustion judgment (i.e., running state) of the started internal combustion engine 52. As a result, when it is judged that the complete combustion is performed (time te, arrow h), the engine starting control and the driving force restraining control are terminated (step S19). Thus, for the first motor 5 and the second motor 7, the supply of electric power is stopped from the judging time point of the complete combustion and the torque is reduced (arrows l, m) and the state of torque 0 is attained in a short time.

In contrast to this, when it is judged that complete combustion has not been attained in step S17, the process proceeds to step S18. In step S18, it is judged whether the value of the timer 3, set in step S15, becomes a prescribed value 3 or more. If as a result, it is judged that the value of the timer is the prescribed value 3 or more, the process proceeds to step S13 and the engine starting control and the driving force restraining control are terminated. Thereafter, the error signal is set to ON (step S14) and the processing is terminated.

After the engine starting control and the driving force restraining control are terminated in step S19, the internal combustion engine 52 continues idling for a predetermined time under control of the engine control means 43 and is then stopped.

For example, when the shift lever (not shown) is operated and moved to the D-range by the driver and the accelerator pedal is stepped on after the idling is terminated, the second motor driving control means 45 controls the driving of the second motor 7 through the inverter 31 on the basis of information, such as an inputted accelerator aperture, etc. Thus, the driving force of the second motor 7 transmitted through the stepped speed change gear 10 in the state switched to the low speed stage is transmitted to the drive wheels 21, 21 through the output shaft 9, the propeller shaft 24, the differential device 20 and the left and right drive shafts so that the vehicle starts running.

Thereafter, when the vehicle reaches a predetermined running speed (e.g., 10 km/h), the stopped internal combustion engine 52 is again started by driving the first motor 5 by the control of the first motor driving control means 44. Thus, the output of the engine 52 is transmitted to the power distributing planetary gear 6 through the crankshaft 2 and the input shaft 8, and is distributed to the first motor 5 and the intermediate shaft 15 by the planetary gear 6. Further, the output rotation from the intermediate shaft 15 is steplessly adjusted by controlling the operation of the first motor 5 by the first motor driving control means 44. Namely, the output of the internal combustion engine 52 and the input of the intermediate shaft 15 are controlled by controlling the reaction force applied to the sun gear S1 in the power distributing planetary gear 6 by the first motor 5.

The rotation of the output shaft 9 is transmitted to the drive wheels 21, 21 through the propeller shaft 24, etc. by rotating the output shaft 9 together with the intermediate shaft 15. In this case, the second motor 7 is once stopped in accordance with the situation, but is driven by the control of the second motor driving control means 45 as needed. In this case, the speed changing operation of the stepped speed change gear 10 is performed at a suitable time by performing the applying and releasing operations of the brakes B1, B2. Thus, the output of the low or high speed stage is taken out of the carrier CR2 of the speed change gear 10 and is transmitted to the drive wheels 21, 21 through the output shaft 9, etc., and assists the driving force from the engine 52 side.

As explained above, in accordance with this first mode, the electrically operated oil pump driving control means 50, operated on the basis of the engine starting signal outputted by turning-on the ignition switch 28, operates the electrically operated oil pump 12 prior to the control of the engine driving control means (43 to 45, 47) based on the engine driving signal generated after the output of the starting signal. Accordingly, the operating oil pressure of the brakes B1, B2 can be reliably generated by operating the electrically operated oil pump 12 before the second motor 7 is driven prior to the engine 52 starting.

Thus, although the drive unit 1 for a vehicle has the stepped speed change gear 10 of a structure unable to connect the second motor 7 and the output shaft 9 unless the brakes B1, B2 are engaged, the engine starting can be executed while reliably attaining a state able to restrain the reaction force in the power distributing planetary gear 6 due to the driving of the first motor 5. Accordingly, it is possible to reliably prevent an uncomfortable feeling caused by the reaction force at the engine starting time. The torque change due to the generation of the driving force in igniting the internal combustion engine 52, associatively rotated by driving the first motor 5, can be absorbed by controlling the output torque of the second motor 7 so as to cancel the torque increasing amount of the torque change at its detecting time while the torque applied to the output shaft 9 is monitored by the torque sensor 51.

Further, because the stepped speed change gear 10 is switched to the low speed stage at the engine starting time, the output torque of the second motor 7 can be reduced and can be more effectively applied as an output torque for restraining the reaction force due to the first motor 5. Further, the stepped speed change gear 10 can be reliably transferred to the state connecting the second motor 7 and the output shaft 9 at the engine starting time by merely switching the engaging state of the brakes B1, B2 at a suitable time on the basis of the supply of the oil pressure from the hydraulic controller 13 to the hydraulic servos 33, 34.

At the control time of the engine driving control means (43 to 45, 47), the stepped speed change gear 10 is switched to the low speed change by engaging the brake B2 on the low speed stage side on the basis of the operation of the solenoid valve SLV2. Accordingly, at the engine starting time, the stepped speed change gear 10 is rapidly switched to the low speed stage by operating the solenoid valve SLV2, and the state for restraining the reaction force at the engine starting time can be reliably attained. Further, because the brakes B1, B2 can be operated by the oil pressure using the operation of the mechanical type oil pump 11 at the engine driving time, the electrically operated oil pump 12 functions as an auxiliary structure of the mechanical type oil pump 11. Thus, the electrically operated oil pump 12 can be made compact and the capability of mounting to the vehicle can be further improved.

In this mode, at the control time of the engine driving control means, provided by the engine control means 43, the first motor driving control means 44, the second motor driving control means 45, and the speed change control means 47, the stepped speed change gear 10 can be also structured to be switched to the high speed stage by engaging the brake B1 on the high speed stage side on the basis of the operation of the first solenoid valve SLV1. In this case, the driving force of the second motor 7 can be effectively applied as a driving force for restraining the reaction force due to the first motor 5 by switching the stepped speed change gear 10 to the high speed stage at the control time of the engine driving control means. Further, the stepped speed change gear 10 can be reliably transferred to the state connecting the second motor 7 and the output shaft 9 at the engine starting time by merely switching the engaging state of the brakes B1, B2 at a suitable time on the basis of the supply of the oil pressure from the hydraulic controller 13 to the hydraulic servos 33, 34.

At the control time of the engine driving control means (43 to 45, 47), the second solenoid valve SLV2 is set to a non-operating state by turning off a power source, and the first solenoid valve SLV1 is set to an operating state by turning off the power source. Thus, at the engine starting time, the stepped speed change gear 10 is rapidly switched to the high speed stage by operating the solenoid valve SLV1, and the state for restraining the reaction force at the engine starting time can be reliably attained. In this case, as can be seen from FIG. 6, the load applied to the battery for the power supply can be reduced as the high speed stage is achieved by turning off the power source of both the solenoid valves SLV1, SLV2.

Figure 9:
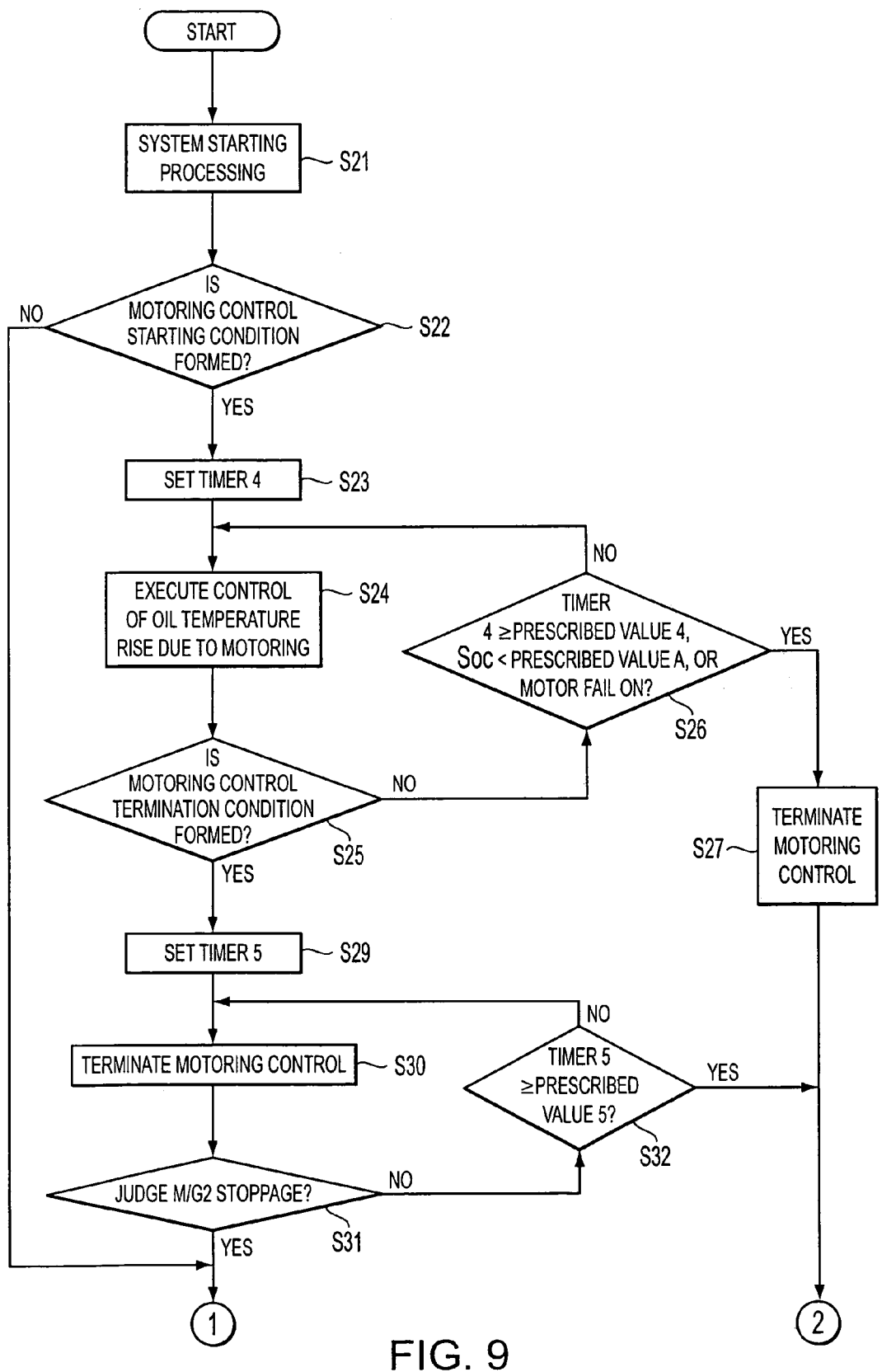
FIG. 9 is a flow chart showing a control example using a drive unit for a vehicle in a second mode of the invention.
Figure 10:
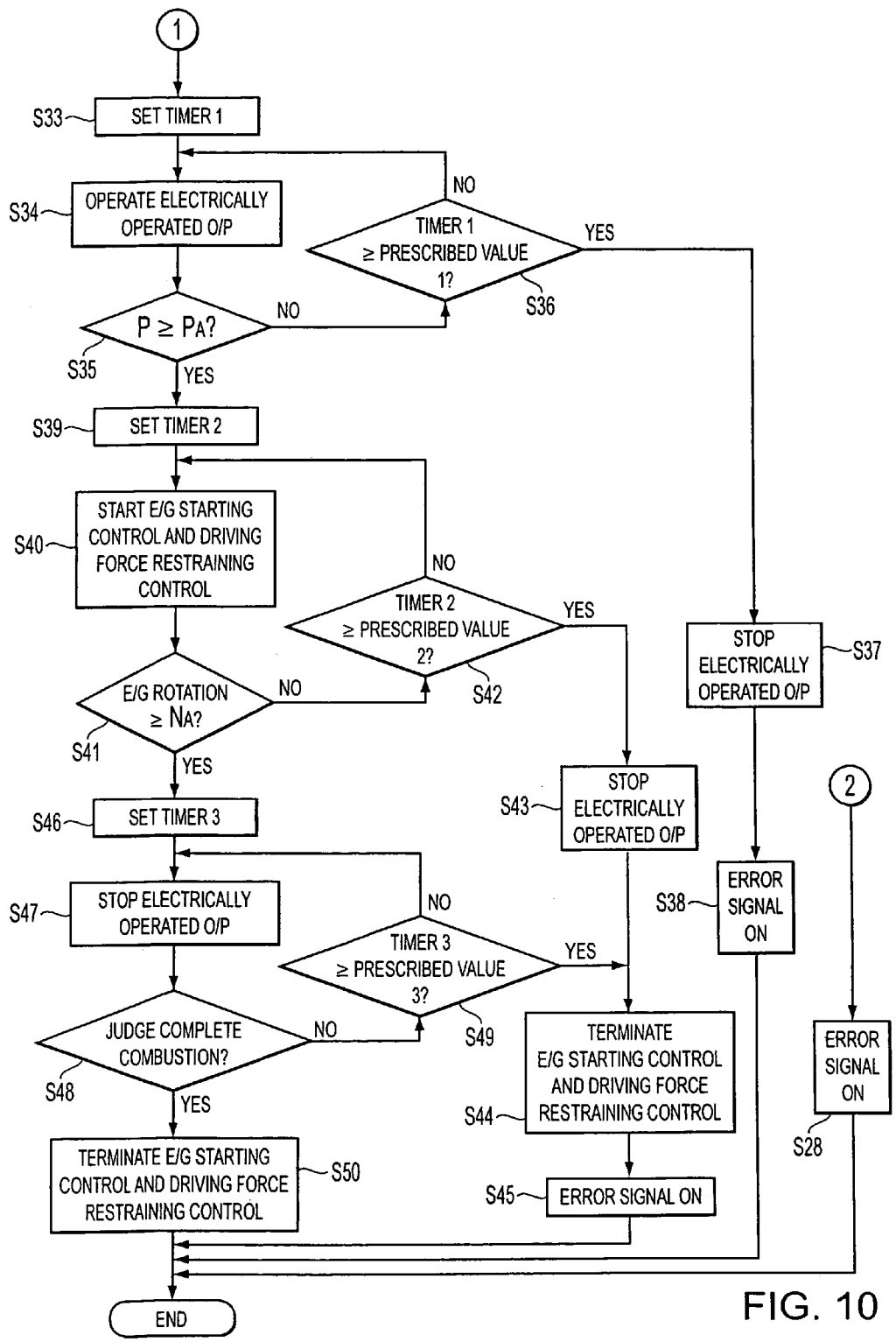
FIG. 10 is a flow chart showing the control example using the drive unit for a vehicle in the second mode.

A second mode of the invention will be explained using FIGS. 9 to 11. This mode differs from the first mode only in that the second motor 7 is once driven prior to the starting operation of the electrically operated oil pump 12 during starting the engine. The other portions in this mode are approximately the same as the first mode. Therefore, the explanation will be made by quoting FIGS. 1 to 6. Only steps S21 to S32 in FIG. 9, are newly added steps for this mode, but the steps after step S33 in FIG. 10 are substantially the same as the steps after step S2 of FIG. 7 in the first mode. Further, each change of the electrically operated oil pump driving signal, the oil pressure applied to the brakes B1, B2, the motor torque of the first motor 5, the motor torque of the second motor 7, the torque of the output shaft 9 and the engine rotation number commencing with time $t_D$ in FIG. 11 is substantially the same as the changes of FIG. 8 in the first mode commencing at time $t_b$.

Figure 11:
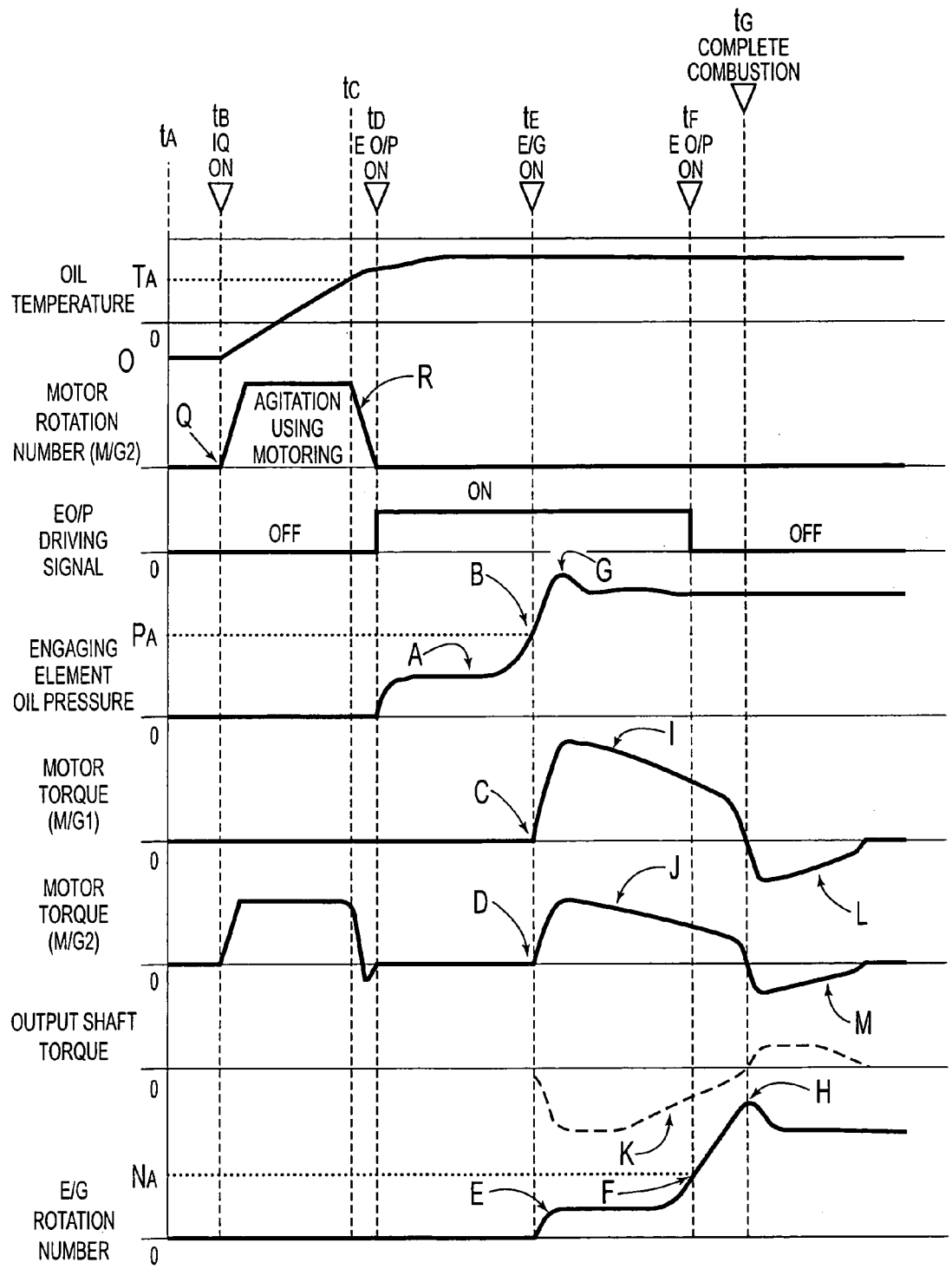
FIG. 11 is a time chart corresponding to FIGS. 9 and 10.

FIG. 11, from top to bottom, shows the temperature of oil returned to the hydraulic controller 13, the rotation number of the second motor 7 (M/G2), the electrically operated oil pump (EO/P) driving signal, the oil pressure (engaging element oil pressure) applied to the brakes B1, B2, the motor torque of the first motor 5 (M/G1), the motor torque of the second motor 7 (M/G2), the torque of the output shaft 9 and the engine (E/G) rotation number.

When the ignition switch 28 is turned on in the stopped states of the internal combustion engine 52, the first motor 5 and the second motor 7 (time $T_A$ of FIG. 11), the control section U starts system starting processing for starting each control means, etc. (step S21). It is then judged whether a motoring control starting condition for judging whether the detected oil temperature reaches a predetermined value, etc. is formed prior to the starting driving of the second motor 7 in starting the engine S52 (step S22). If yes, processing proceeds to step S23 where it is judged that the motoring control starting condition is formed because the oil temperature detected by the oil temperature detecting means 49 is less than the predetermined value $T_A$ (time $t_A$, arrow O), etc. In contrast to this, when it is judged the motoring control starting condition is not formed (step S22, No), processing jumps to step S33 so as not to execute motoring control.

After a timer 4 is set in step S23 following the judgment that the motoring control starting condition exists, oil temperature raising control using motoring is executed (step S24). Namely, the second motor driving control means 45 operates and starts the second motor 7 so as to attain a predetermined rotation number while the internal combustion engine 52 and the first motor 5 remain in a stopped state (time $t_B$, arrow Q). In the meantime, the second motor driving control means 45 monitors the oil temperature detected by the oil temperature detecting means 49.

Subsequently, in step S25, the second motor driving control means 45 judges whether a motoring control terminating condition is formed, i.e., whether the oil temperature reaches the predetermined value $T_A$. As its result, when it is judged that the oil temperature reaches the predetermined value $T_A$, processing proceeds to step S29. In contrast to this, when it is judged that the oil temperature has not reached the predetermined value $T_A$, processing proceeds to step S26.

When it is judged in step S26 that conditions conform to at least one of the respective conditions of 1) the value of the timer 4, set in step S23, becomes a prescribed value 4 or more; 2) the SOC (remaining charge amount) of the battery 34 is less than a prescribed value A, and 3) there is a failure in the second motor 7 (ON), the motoring control is terminated in the step S27.

In the motoring control termination (S27), the rotation due to inertia of the second motor 7 is changed (arrow R) toward a rotation number 0 (time $t_D$) due to the resistance of oil, etc. by stopping the driving signal transmitted to the second motor 7 (time $t_C$). Thereafter, in step S28, because of the failure detected, the error signal is set to ON and the processing is terminated. In contrast to this, when it is judged in step S26 that none of the conditions are met, the process returns to step S24 and processing from step S24 is repeated.

Further, when the motoring control termination condition is formed in step S25 (Yes), in step S29 a timer 5 is set and processing proceeds to step S30. In step S30, similar to step S27, the motoring control is terminated and it is then judged in step S31 whether the rotation of the second motor (M/G2) 7 is stopped. When the second motor 7 is not stopped, processing proceeds to step S32 and it is judged whether the value of the timer 5, set in the above step S29, becomes a prescribed value 5 or more. When it is judged that the value of the timer 5 is the prescribed value 5 or more, processing proceeds to step S28 and the processing described above is performed. In contrast to this, when it is judged that the value of the timer 5 is less than the prescribed value 5, the processing from step S30 is repeated. Further, when it is judged in step S31 that the stoppage of the second motor 7 has occurred, processing proceeds to step S33 and the same control as the control after step S2, shown in FIG. 7, is executed.

Namely, after the timer 1 is set in step S33, the operation of the electrically operated oil pump 12 is started on the basis of the engine starting signal outputted on the basis of the ignition switch 28 which was previously turned on (step S34). Namely, when the electrically operated oil pump driving control means 50, operated on the basis of the engine starting signal, outputs the driving signal of the electrically operated oil pump 12 through the inverter 29 for the electrically operated oil pump (time $t_D$), the engaging element oil pressure P is gradually raised from the time $t_D$ by starting the operation of the electrically operated oil pump 12 (arrow A). In this case, while the hydraulic detecting means 48 monitors the rising oil pressure P, the hydraulic detecting means 48 judges whether the oil pressure P becomes a predetermined value $P_A$ or more (step S35). As its result, when the hydraulic detecting means 48 judges that the oil pressure P becomes the predetermined value $P_A$ or more (time $t_E$, arrow B), processing proceeds to step S39. In contrast to this, when the hydraulic detecting means 48 judges that the oil pressure P has not become the predetermined value $P_A$ or more, the process proceeds to step S36. It is then judged whether the value of the timer 1, set in advance, is the prescribed value 1 or more.

If the value of the timer 1 is less than the prescribed value 1 in step S36, the processing of steps S34 and S35 are repeated. In contrast to this, when it is judged that the value of the timer 1 is the prescribed value 1 or more, the operation of the electrically operated oil pump 12 is stopped (step S37). Further, because a failure is detected, the error signal is set to ON (step S38) and the processing is terminated.

On the other hand, when step S35 is yes, the timer 2 is set in step S39 and the engine starting control and the driving force restraining control are started in step S40. Namely, the first motor driving control means 44 starts the driving of the first motor 5 so as to associatively rotate the engine 52 in response to the engine driving signal until the engine 52 reaches a predetermined rotation number (time $t_E$, arrow C). Simultaneously, the second motor driving control means 45 starts the torque output so as to be able to restrain the reaction force based on the driving of the first motor 5 (time $t_E$, arrow D). In step S41, the engine control means 43 judges whether the rotation number (arrow E) of the engine 52 is a predetermined starting rotation number $N_A$ or more. As a result, when it is judged that the rotation number of the engine 52 is the predetermined rotation number $N_A$ or more (time $t_F$, arrow F), ignition control is performed and processing proceeds to step S46.

In the ignition control, the second motor driving control means 45 monitors the torque applied to the output shaft 9 at all times. When the second motor driving control means 45 detects a torque change due to the engine ignition, the second motor driving control means 45 controls the output torque of the second motor 7 so as to cancel this torque increasing amount. Thus, the engine can be started without any torque change in the output shaft 9 (as shown by the solid line). The arrow G after the time $t_E$ shows a temporary oil pressure increase caused by starting the generation of the oil pressure from the mechanical type oil pump 11 by the rotation of the engine 52 beginning to be associatively rotated. Further, the broken line shown by the arrow K shows output shaft torque when no driving force restraining control using the second motor (M/G2) 7 is executed.

When it is judged in step S41 that the engine rotation number is less than the predetermined rotation number $N_A$, processing proceeds to step S42. In step S42, it is judged whether the value of the timer 2 is the prescribed value 2 or more. If the value of the timer 2 is less than the prescribed value 2 as a result of the comparison in step S42, the processing from step S40 is repeated. In contrast to this, when it is judged that the value of the timer 2 is the prescribed value 2 or more, the operation of the electrically operated oil pump 12 is stopped (step S43), and the engine starting control and the driving force restraining control are terminated (step S44). Further, the error signal is set to ON (step S45) and the processing is terminated.

After step S41, yes, in step S46, the timer 3 is set and the electrically operated oil pump signal is then set to OFF in step S47 (time $t_F$) and the operation of the electrically operated oil pump 12 is stopped. Thereafter, the complete combustion judgment for the engine 52 is made in step S48. When it is judged the complete combustion is performed (time $t_G$, arrow H), the engine starting control and the driving force restraining control are terminated (step S50). Thus, in the first motor 5 and the second motor 7, the supply of electric power is stopped from the judging time point of the complete combustion, and the torque is reduced (arrows L, M) and the state of torque 0 is attained in a short time.

In contrast to this, when it is judged in step S48 that complete combustion is not performed, processing proceeds to step S49. In step S49, it is judged whether the value of the timer 3 is the prescribed value 3 or more. When it is judged the value of the timer 3 is the prescribed value 3 or more, the process proceeds to step S44 and the engine starting control and the driving force restraining control are terminated. Thereafter, the error signal is set to ON (step S45) and the processing is terminated.

After the engine starting control and the driving force restraining control are terminated in step S50, the internal combustion engine 52 continues idling for a predetermined time under the control of the engine control means 43 and is then stopped.

In accordance with the second mode explained above, the following effects can be obtained in addition to the effects obtained in the first mode. Namely, the second motor 7 is operated until the oil temperature becomes a predetermined value prior to the operation of starting the electrically operated oil pump 12 using the electrically operated oil pump driving control means 50. Accordingly, although it is a disadvantageous situation to operate the electrically operated oil pump 12 when the oil temperature is normally low and viscosity is high before the engine starting, the pump can be operated in a state in which the oil within the case 4 is first agitated by driving the second motor 7 and the oil temperature is raised and the viscosity is reduced by its agitating resistance. Thus, because the load on the electrically operated oil pump 12 at its operation starting time can be greatly reduced, a need to have a large electrically operated oil pump 12 to guarantee a preferable pump operation starting state disappears and the mounting property to the vehicle can be improved.

In this mode, the operation of the second motor 7 is controlled at the rising control time of the oil temperature so as to operate the second motor 7 until the oil temperature reaches a predetermined value. However, the invention is not limited to this case. For example, the drive unit can be also structured such that the second motor 7 is operated until a predetermined time set in advance has passed.

What is claimed is:

1. A drive unit for a vehicle comprising a first motor, power distributing means, a second motor, and a stepped speed change gear having frictional engaging means, wherein an engine driving force transmitted to an input shaft is distributed and transmitted to the first motor and an output section by the power distributing means, and the second motor is operated in association with the output section through the stepped speed change gear for performing a speed changing operation in accordance with the operation of the frictional engaging means, and an engine is started on the basis of the driving of the first motor, the drive unit further comprises:

engine driving control means for driving the first motor on the basis of an engine driving signal, and driving the second motor so as to restrain a reaction force in the power distributing means due to the driving of the first motor in a state in which the stepped speed change gear connects the second motor and the output section by the frictional engaging means;

an electrically operated oil pump for generating an operating oil pressure of the frictional engaging means; and an electrically operated pump control section having pump operation control means for operating the electrically operated oil pump prior to the control of the engine driving control means on the basis of an engine starting signal outputted in a vehicle stopped state.

2. The drive unit for a vehicle according to claim 1, wherein the stepped speed change gear is able to be switched to a plurality of speed change stages, and is switched to a low speed stage among the plurality of stages at the control time of the engine driving control means.

3. The drive unit for a vehicle according to claim 2, wherein the stepped speed change gear has a planetary gear unit, and the frictional engaging means is a plurality of brakes for engaging a predetermined rotating element of the planetary gear unit, and
   a hydraulic controller for controlling the oil pressure supplied to a hydraulic servo for operating the plurality of brakes.

4. The drive unit for a vehicle according to claim 3, wherein the hydraulic controller has a first solenoid valve for high speed stage switching and a second solenoid valve for low speed stage switching, and the stepped speed change gear is switched to the low speed stage by engaging the brake on the low speed stage side on the basis of the operation of the second solenoid valve at the control time of the engine driving control means.

5. The drive unit for a vehicle according to claim 4, wherein motor driving control means for controlling the operation of the second motor is provided, the second motor is provided within a case for storing oil to be supplied to the hydraulic controller, and the motor driving control means drives the second motor until a predetermined condition is satisfied prior to the operation of starting the electrically operated oil pump using the pump operation control means.

6. The drive unit for a vehicle according to claim 4, further comprising a mechanical type oil pump for generating the operating oil pressure of the frictional engaging means on the basis of the driving of the engine.

7. The drive unit for a vehicle according to claim 3, further comprising motor driving control means for controlling the operation of the second motor, wherein the second motor is arranged within a case for storing oil to be supplied to the hydraulic controller, and the motor driving control means drives the second motor until a predetermined condition is satisfied prior to the operation of starting the electrically operated oil pump using the pump operation control means.

8. The drive unit for a vehicle according to claim 7, further comprising a mechanical type oil pump for generating the operating oil pressure of the frictional engaging means on the basis of the driving of the engine.

9. The drive unit for a vehicle according to claim 3, further comprising a mechanical type oil pump for generating the operating oil pressure of the frictional engaging means on the basis of the driving of the engine.

10. The drive unit for a vehicle according to claim 2, further comprising a mechanical type oil pump for generating the operating oil pressure of the frictional engaging means on the basis of the driving of the engine.

11. The drive unit for a vehicle according to claim 1, wherein the stepped speed change gear is able to be switched to a plurality of speed change stages, and is switched to a high speed stage among the plurality of stages at the control time of the engine driving control means.

12. The drive unit for a vehicle according to claim 11, wherein the stepped speed change gear has a planetary gear unit, and the frictional engaging means is a plurality of brakes for engaging a predetermined rotating element of the planetary gear unit, and a hydraulic controller for controlling the oil pressure supplied to a hydraulic servo for operating the plurality of brakes is provided.

13. The drive unit for a vehicle according to claim 12, wherein the hydraulic controller has a first solenoid valve for high speed stage switching and a second solenoid valve for low speed stage switching, and the stepped speed change gear is switched to the high speed stage by engaging the brake on the high speed stage side on the basis of the operation of the first solenoid valve at the control time of the engine driving control means.

14. The drive unit for a vehicle according to claim 13, further comprising motor driving control means for controlling the operation of the second motor, wherein the second motor is arranged within a case for storing oil to be supplied to the hydraulic controller, and the motor driving control means drives the second motor until a predetermined condition is satisfied prior to the operation of starting the electrically operated oil pump using the pump operation control means.

15. The drive unit for a vehicle according to claim 13, further comprising a mechanical type oil pump for generating the operating oil pressure of the frictional engaging means on the basis of the driving of the engine.

16. The drive unit for a vehicle according to claim 12, further comprising a mechanical type oil pump for generating the operating oil pressure of the frictional engaging means on the basis of the driving of the engine.

17. The drive unit for a vehicle according to claim 11, further comprising a mechanical type oil pump for generating the operating oil pressure of the frictional engaging means on the basis of the driving of the engine.

18. The drive unit for a vehicle according to claim 1, further comprising a mechanical type oil pump for generating the operating oil pressure of the frictional engaging means on the basis of the driving of the engine.

19. A drive unit for a vehicle comprising a first motor, a power distributing element, a second motor, and a stepped speed change gear having frictional engaging elements, wherein an engine driving force transmitted to an input shaft is distributed and transmitted to the first motor and an output section by the power distributing element, and the second motor is operated in association with the output section through the stepped speed change gear for performing a speed changing operation in accordance with the operation of the frictional engaging elements, and an engine is started on the basis of the driving of the first motor, the drive unit further comprises:
   an engine driving control device that drives the first motor on the basis of an engine driving signal, and drives the second motor so as to restrain a reaction force in the power distributing element due to the driving of the first motor in a state in which the stepped speed change gear connects the second motor and the output section by the frictional engaging elements;
   an electrically operated oil pump for generating an operating oil pressure of the frictional engaging elements; and
   an electrically operated pump control section having a pump operation control element that operates the electrically operated oil pump prior to the control of the engine driving control device on the basis of an engine starting signal outputted in a vehicle stopped state.

20. A method for controlling a drive unit for a vehicle having a first motor, a power distributing element, a second motor, and a stepped speed change gear having frictional engaging elements, wherein an engine driving force transmitted to an input shaft is distributed and transmitted to the first motor and an output section by the power distributing element, and the second motor is operated in association with the output section through the stepped speed change gear for performing a speed changing operation in accordance with the operation of the frictional engaging elements, and an engine is started on the basis of the driving of the first motor, comprising:

driving the first motor on the basis of an engine driving signal, driving the second motor so as to restrain a reaction force in the power distributing means due to the driving of the first motor in a state in which the stepped speed change gear connects the second motor and the output section by the frictional engaging means;

generating an operating oil pressure of the frictional engaging elements; and operating the electrically operated oil pump prior to driving the first and second motors on the basis of an engine starting signal outputted in a vehicle stopped state.

* * * * *